Nov. 1, 1938.  E. W. BAXTER  2,134,748
STEERING MECHANISM
Filed Feb. 12, 1937  2 Sheets-Sheet 1

INVENTOR
Ernest W. Baxter
BY
Morgan Finnegan and Durham
ATTORNEYS

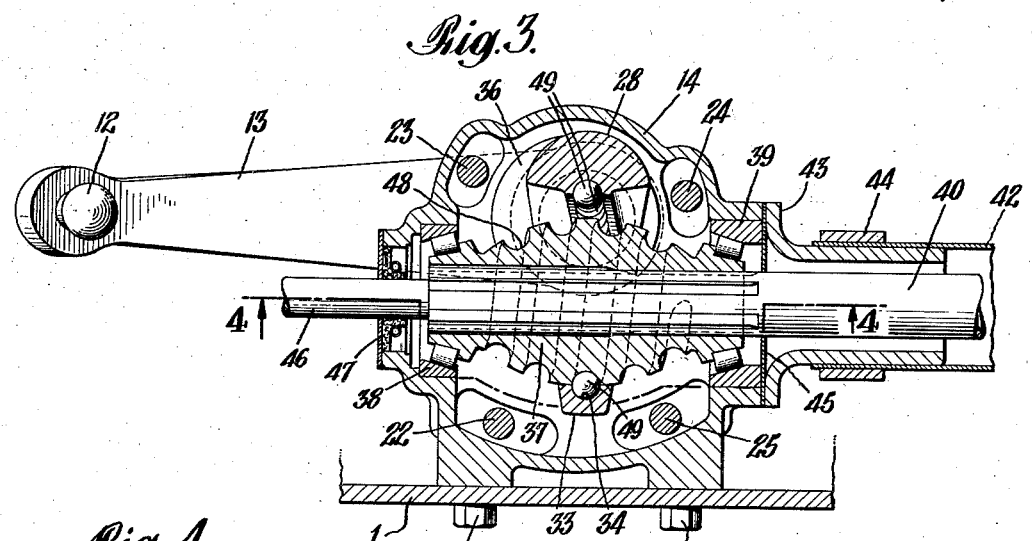
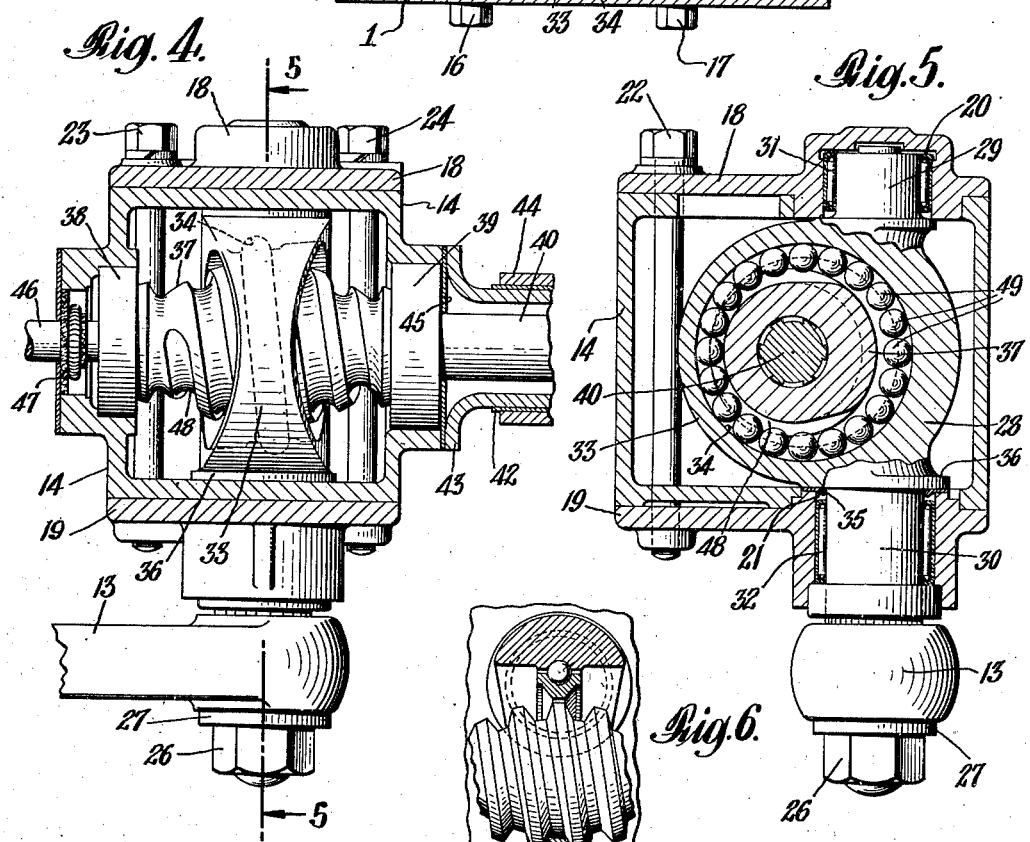

Patented Nov. 1, 1938

2,134,748

UNITED STATES PATENT OFFICE 2,134,748

STEERING MECHANISM

Ernest W. Baxter, Detroit, Mich.

Application February 12, 1937, Serial No. 125,377

4 Claims. (Cl. 74—500)

This invention relates generally to steering gear for dirigible vehicles and more particularly to improvements in that portion of the steering gear by which a torque applied in one plane may be made available for use in another plane to effect a movement of the elements by which a change in course of the vehicle is ultimately caused to take place.

Devices for effecting a transfer of applied steering torque from one plane into another are well known, particularly in connection with dirigible land vehicles of the automotive type. The worm and sector as a torque transferring device has been widely used in automobile steering gears, but like other similar devices adapted for the same purpose, possesses certain obvious disadvantages militating against ease of steering and resulting in rapid wear of the contacting moving parts. The automobile industry has engaged in long and expensive research programs looking toward the development of a torque transferring device for automotive steering gear which would eliminate the disadvantages in the devices presently known in the art.

An object of this invention is to provide a torque transferring device in which resistance to operation due to friction is substantially eliminated.

Another object of this invention is to provide a torque transferring device particularly adapted for transferring a steering effort to the course controlling elements of a dirigible vehicle which is so compact as to permit its use in a small space, and in which a low bearing pressure is maintained at the points of contact of the moving parts.

A further object of this invention is to provide a torque transferring device adapted for use in the steering gear of dirigible vehicles which is simple in construction, may be cheaply manufactured, and may be quickly disassembled for examination or replacement of its moving parts.

Other and further objects of this invention will appear from the following description and drawings and the appended claims.

Figure 1:
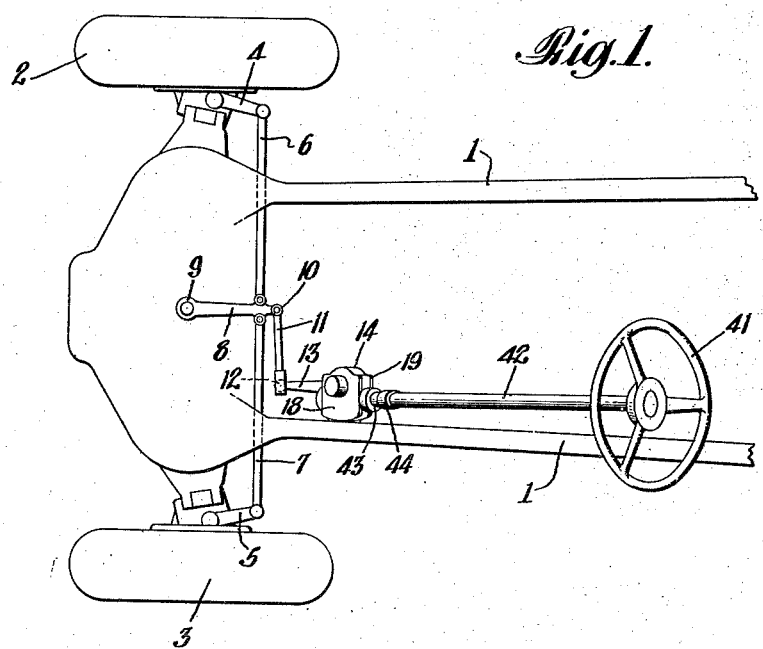
Figure 2:
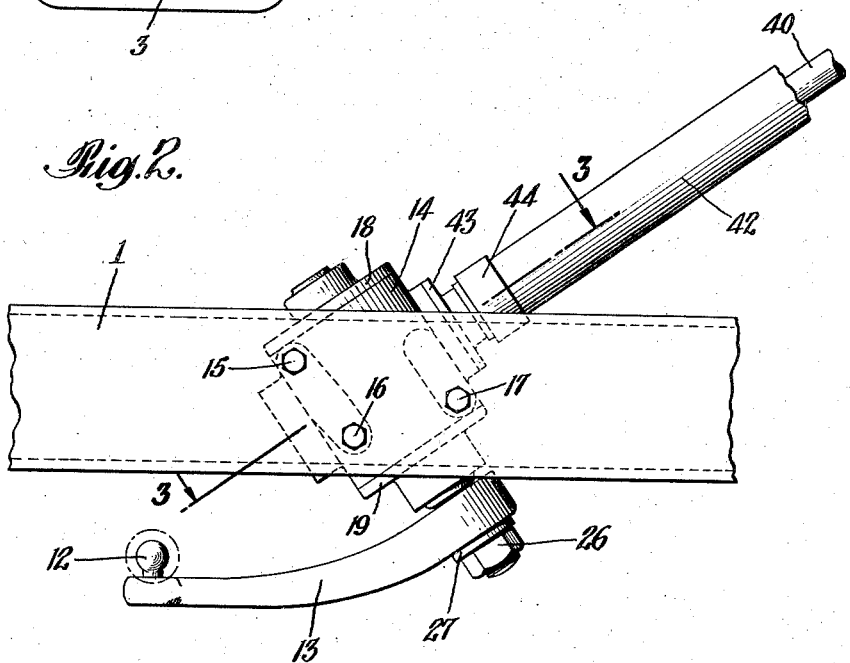

In the accompanying drawings which form part of the instant specification and are to be read in conjunction therewith and in which like numbers refer to like parts throughout the several views;

Fig. 1 is a plan view of a portion of dirigible wheeled land vehicle provided with steering gear embodying the torque transferring device forming the subject matter of this invention, Fig. 2 is a somewhat enlarged view in side elevation of the torque transferring device shown in Fig. 1, Fig. 3 is a view with parts in section taken along the line 3—3 of Fig. 2, Fig. 4 is a view with parts in section taken along the line 4—4 of Fig. 3, Fig. 5 is a view with parts in section taken along the line 5—5 of Fig. 4; and Figure 6 is a fragmentary detailed sectional view of a modified embodiment of the present invention.

In general, this invention comprises a rotatable driving element having a threaded arcuate surface of revolution and a rotatable driven element whose axis of rotation is at right angles to that of the driving elements and is also concentric with the circle, of which an arc forms the generatrix of the surface of revolution. The driving element actuates the driven element through suitable anti-friction means carried by the driven element and engaging the thread of the driving element.

Referring now more particularly to the drawings, there is shown for purposes of illustration a portion of the chassis 1 of a dirigible wheeled land vehicle, to which chassis are journalled the steering wheels 2 and 3 having the steering knuckles 4 and 5 respectively. Tie rods 6 and 7 are each pivotally connected at one end to the steering knuckles 4 and 5 respectively and at the other end to a member 8. The member 8 is pivotally connected at one end 9 to the chassis 1 and at the other end 10 to one end of a drag link 11 whose opposite end is provided with a socket engaging a ball element 12 of a pitman arm 13 of the torque transferring device forming the subject matter of this invention.

A torque transferring device housing member 14 is fastened to the chassis 1 by the stud bolts 15, 16 and 17, and is capped at the top and bottom by the cap members 18 and 19 respectively. The cap members 18 and 19 are provided with bearing openings 20 and 21 respectively and are clamped to the housing member 14 by means of a plurality of stud bolts 22, 23, 24 and 25 passing through the top cap member 18 and the housing member 14 into screw threaded engagement with the bottom cap member 19, lock washers being provided between the respective bolt heads and the top cover member as shown.

The pitman arm 13 is fixedly mounted, by means of a nut 26 and lock washer 27, on one end of a shaft or driven element 28 rotatably mounted in the housing member 14 as by bearing surfaces 29 and 30 journalled in roller bearings 31 and 32 respectively positioned in the openings 20 and 21. The opening 21 is capped by an annular oil retainer snugly fitting around the shaft 28 against the roller race of the bearing 32.

The shaft 28 is formed with a laterally projecting annulus 33 whose inner periphery is recessed to form an annular ball race 34, the medial plane of which is at an angle to the plane of the shaft axis as will be more fully pointed out hereinafter.

An oil retaining washer 35 is interposed between a flange 36 on the shaft 28 and the lower bottom cap member 19 to prevent lubricant within the housing 14 from passing into the bearing opening 21.

A hollow driving element or worm 37 is supported at each end within the housing member 14 and at right angles to the shaft 28 by the roller thrust bearings 38 and 39 respectively. A hollow shaft 40 having a splined end portion fixedly engaging the driving element 37 internally thereof, in such manner as will be well understood by those skilled in the art, is provided at its opposite end with a steering wheel 41 or other suitable torque applying instrumentality and may be housed throughout its length between the wheel 41 and the housing member 14 in a conventional manner as by a casing 42 conveniently fastened to the housing member 14 by means of a tubular flange 43 and clamping ring 44. An oil retaining washer 45 is clamped between the flange 43 and the housing member 14 to prevent passage of lubricant from the interior of the housing member 14 into the casing 42. It will be understood that the wheel 41 and casing 42 form no part of the present invention, but are merely described as one means for effecting the application of a torque to the shaft 40 and driving element 37.

A tubular conduit 46 carried within the hollow shaft 40 and adapted for the reception of wires passing to electrical controlling instruments on the wheel 41 projects from the splined end portion of the shaft 40 through an oil retaining washer and gasket 47 fastened to the housing member 14.

The driving element 37 has a periphery formed as an arcuate surface of revolution developed from the rotation about the axis of the driving element of the arc of a circle whose center lies along the axis of the shaft 28.

A helicoidal groove 48 having a constant lead or pitch is formed in the surface of the driving element 37 and this groove is engaged by several of a number of anti-friction bearing members preferably consisting of a complete series of metal balls 49 retained in the race 34, the balls 49 contacting with the groove 48 for a limited space and with each other throughout the race.

The construction is such that the driving element or worm 37 is located within and extends through the annulus 33 and thus extends through the race 34, the medial plane of which is inclined to the axis of the shaft 28 and to the axis of the driving element 37 such that it is always parallel to the tangent of the helicoidal groove with which and the race 34 a number of the balls 49 are always in rolling contact.

The axis of the annulus 33 and thus of the race 34 is eccentric to the axis of the driving element 37 so that a number of the balls 49 contact the race 34 and groove 37 at a region farthest from the axis of the shaft 28. The remainder of the balls 49 do not again contact both the groove 48 and the race 34 until they have been returned through the race due to rotation of the driving element 37.

It will be observed that, as the shaft 40 is rotated as for example by the application of a steering effort to the wheel 41, the driving element 37 is caused to rotate therewith. The torque developed is transferred through the balls 49 to the annulus 33 entirely by rolling friction and, as the balls 49 follow the course of the groove 48, the shaft or driven element 28 is caused to be rotated about its axis, thus developing a torque in a plane at right angles to the plane in which the torque is developed by the driving element 37. By reason of the novel features of this invention, the friction loss is reduced to a minimum such that the torque applied at the wheel 41 and the torque made available for operation of the drag link 11 through the shaft 28 are substantially identical. Ease of steering results by reason of this low friction loss; a compact device is provided since the axes of the driving and driven elements are in relatively close proximity to each other, permitting the utilization of the torque transferring device in a limited space; and, the torque transferred from the driving to the driven element is effected through a plurality of the balls so that the pressure at the point of ball-bearing contact is relatively low.

As shown in Figure 6 of the drawings, the oscillatable annular race 33 in which the ball bearings 49 are retained may be provided with an inner race 50 which has an inner face similar in shape to the shape of the thread 48 of the worm 37 so that the actual contact between the worm thread 48 and the annular arm 33 is effected by a solid race, rather than by the series of ball bearings, as in Figures 3 to 5.

It will be observed that the objects of this invention have been accomplished and that there has been provided a torque transferring device which is not only particularly adapted for use in dirigible wheeled land vehicles of the automotive type, but is also adapted for use in course changing apparatus for dirigible marine vessels or for aircraft.

It will be observed that certain features and sub-combinations are of utility and may be employed without reference to other features and sub-combinations. This is contemplated by and is within the scope of the appended claims. It is further obvious that various changes may be made in details within the scope of the appended claims without departing from the spirit of this invention. It is, therefore, to be understood that this invention is not to be limited to the specific details shown and described.

Having thus described this invention, what is claimed is:

1. In a steering gear, a pivotally mounted pitman arm, an annular ball race fixed thereto, a worm cooperating therewith and having an arcuate surface of revolution, a helicoidal groove therein having a constant pitch, the axis of said worm being eccentric to said ball race, the ball race being inclined to said axis and parallel to the tangent of the helicoidal groove at their point of adjacency and a series of balls in said race contacting with said groove, said worm being located within and extending through said race.

2. In a steering gear, a pivotally mounted pitman arm, an annular race fixed thereto, a worm cooperating therewith and having an arcuate surface of revolution, a helicoidal groove therein, the axis of said worm being eccentric to said race, the pivot of said pitman arm being concentric with the arcuate surface of the worm, the race being inclined to said axis and parallel to the tangent of the helicoidal groove at their point of adjacency, said worm being located within and extending through said race.

3. In a steering gear, a pivotally mounted pitman arm, an annular race fixed thereto, a worm cooperating therewith and having an arcuate surface of revolution, a helicoidal groove therein, the axis of said worm being eccentric to said race, the pivot of said pitman arm being concentric with the arcuate surface of the worm, the race being inclined to said axis and parallel to the tangent of the helicoidal groove at their point of adjacency and means rotatable on said race forming a connection between the race and groove, said worm being located within and extending through said race.

4. In a steering gear, a pivotally mounted pitman arm, an annular race fixed thereto, a worm cooperating therewith and having an arcuate surface of revolution, a helicoidal groove therein, the axis of said worm being eccentric to said race, the race being inclined to said axis and parallel to the tangent of the helicoidal groove at their point of adjacency and a complete series of balls retained in said race and contacting with each other and with said groove for a limited space, said worm being located within and extending through said race.

ERNEST W. BAXTER.